(12) United States Patent
Okugawa

(10) Patent No.: US 7,557,988 B2
(45) Date of Patent: Jul. 7, 2009

(54) MICROSCOPE SYSTEM

(75) Inventor: Hisashi Okugawa, Yokosuka (JP)

(73) Assignee: Nikon Corporation, Tokyo (JP)

(\*) Notice: Subject to any disclaimer, the term of this patent is extended or adjusted under 35 U.S.C. 154(b) by 0 days.

(21) Appl. No.: 12/010,712

(22) Filed: Jan. 29, 2008

(65) Prior Publication Data

US 2008/0291534 A1 Nov. 27, 2008

Related U.S. Application Data

(60) Division of application No. 11/286,293, filed on Nov. 25, 2005, now Pat. No. 7,382,532, which is a continuation of application No. PCT/JP2004/007604, filed on Jun. 2, 2004.

(30) Foreign Application Priority Data

| Jun. 2, 2003 | (JP) | ............................... 2003-156810 |
| Jun. 17, 2003 | (JP) | ............................... 2003-171820 |

(51) Int. Cl.
  *G02B 21/26* (2006.01)
(52) U.S. Cl. ...................................... 359/395; 359/391
(58) Field of Classification Search ................. 359/382, 359/391, 395
  See application file for complete search history.

(56) References Cited

U.S. PATENT DOCUMENTS

| 2003/0016301 A1 | 1/2003 | Aizaki et al. |
| 2003/0156323 A1 | 8/2003 | Overbeck |

FOREIGN PATENT DOCUMENTS

| JP | U-60-156996 | 10/1985 |
| JP | A-61-9614 | 1/1986 |
| JP | U-62-125211 | 8/1987 |
| JP | A 5-26802 | 2/1993 |
| JP | A-7-333506 | 12/1995 |
| JP | A 2002-72100 | 3/2002 |
| JP | A 2002-372670 | 12/2002 |
| JP | A 2003-15056 | 1/2003 |
| JP | A 2003-57559 | 2/2003 |
| JP | A-2004-198538 | 7/2004 |

*Primary Examiner*—Joshua L Pritchett
(74) *Attorney, Agent, or Firm*—Oliff & Berridge, PLC

(57) ABSTRACT

A microscope system includes a casing in which an optical element is housed, an airtight specimen chamber, and an environment control unit that controls temperature and humidity in the specimen chamber and also controls temperature inside the casing. An upper plate of the specimen chamber is an open/close lid opened and closed when inserting or removing a biological specimen. The casing becomes sealed by a bottom plate of the specimen chamber as the specimen chamber is set on the casing.

4 Claims, 14 Drawing Sheets

MICROSCOPE SYSTEM

This is a Division of application Ser. No. 11/286,293 filed Nov. 25, 2005, which in turn is a Continuation of Application No. PCT/JP2004/007604 filed Jun. 2, 2004. The disclosure of the prior applications is hereby incorporated by reference herein in its entirety.

INCORPORATION BY REFERENCE

The disclosure of the following priority applications are herein incorporated by reference:
Japanese Patent Application No. 2003-156810, filed Jun. 2, 2003
Japanese Patent Application No. 2003-171820, filed Jun. 17, 2003

BACKGROUND OF THE INVENTION

1. Field of the Invention

The present invention relates to a microscope system.

2. Description of Related Art

As rapid progress is made in the field of biotechnology, it has become increasingly important in recent years to be able to observe a biological specimen over an extended period of time or to record an image of the biological specimen while keeping it in an intact condition. A container in which a biological specimen is placed is filled with a liquid referred to as a "culture medium" containing nutrients necessary to sustain life. The temperature at the container is maintained at approximately 37° C., while the humidity inside the container is maintained at a level close to 100%.

Japanese Laid Open Patent Publication No. H5-26802 discloses a thermostatic humidified chamber used to sustain both the temperature and the humidity in a specimen chamber at constant levels and allow microscopic observation of the specimen placed inside the specimen chamber through an observation window. In order to prevent condensation at the observation window, the thermostatic humidifier tank includes a heating element.

In such a microscope system, however, a difference in temperatures between the thermostatic humidified chamber and the microscope causes thermal deformation of parts constituting the microscope, which causes a problem of a focal plane being shifted with time.

SUMMARY OF THE INVENTION

A microscope system according to a first aspect of the present invention includes a stand on which a specimen container is placed, an illuminating device that illuminates a specimen inside the specimen container, an observation optical system through which a specimen is observed from below the specimen container, and a drive device that moves at least part of the observation optical system along a direction substantially perpendicular to an optical axis of the observation optical system relative to a microscope main unit so as to adjust an observation position at the specimen. The stand and the illuminating device are fixed onto the microscope main unit. The microscope may further include a casing in which the observation optical system is housed, an airtight specimen chamber that houses the stand and includes an open/close lid opened and closed when inserting or removing the specimen container, and an environment control unit that controls temperature and humidity in the specimen chamber and also controls temperature inside the casing.

A microscope system according to a second aspect of the present invention includes an observation optical system through which a specimen inside a specimen container is observed, a casing in which the observation optical system is housed, an airtight specimen chamber that houses a stand on which the specimen container is placed and includes an open/close lid opened and closed when inserting or removing the specimen container, and an environment control unit that controls temperature and humidity in the specimen chamber and also controls temperature inside the casing. It is preferable that the casing becomes sealed as the specimen chamber is coupled with the casing at a surface other than the open/close lid. It is preferable that the casing includes a surface at which a transparent member is disposed over an observation optical path, that the specimen chamber comprises a surface at which a transparent member is disposed over the observation optical path, and that the surface of the casing at which the transparent member is disposed and the surface of the specimen chamber at which the transparent member is disposed are optically coupled. Over part or all of the surface of the specimen chamber, which is coupled with the casing to seal the casing, a transparent portion through which the specimen is microscopically observed may be formed.

It is preferable that an illuminating device be mounted at the open/close lid. A level of airtightness at the casing may be lower than the level of airtightness at the specimen chamber. A drive device may be housed inside the casing.

It is preferable that the observation optical system is an infinity optical system constituted with a first objective lens and a second objective lens, that the first objective lens is housed inside the casing and is caused to move by the drive device, that the second objective lens is disposed outside the casing, and that the second objective lens has an aperture large enough to cover a distance over which the first objective lens travels along a direction substantially perpendicular to the optical axis.

The microscope system according to the first aspect may further include an airtight specimen chamber in which the specimen container is placed, and an environment control unit that controls temperature and humidity in the specimen chamber.

The observation optical system may include an infinity objective lens and an image forming optical system that forms an observation image with a parallel light flux from the objective lens, and the drive device may control a range over which the part of the observation optical system moves so as a central ray in a parallel light flux from the specimen present within an effective visual field of the objective lens to pass through an entrance pupil of the image forming optical system.

It is preferable to further include a control device that controls the drive device so as to set the observation optical system at a predetermined reference position. A control device that controls the drive device may further be provided, a plurality of mount portions may be formed at the stand so as to allow a plurality of specimen containers to be placed on the stand, and the control device may control the drive device so as to set the observation optical system at one of a plurality of reference positions set in advance, each in correspondence to one of the plurality of mount portions.

DESCRIPTION OF PREFERRED EMBODIMENTS

First Embodiment

The following is an explanation of a microscope system achieved in the first embodiment of the present invention, given in reference to drawings.

Figure 1:
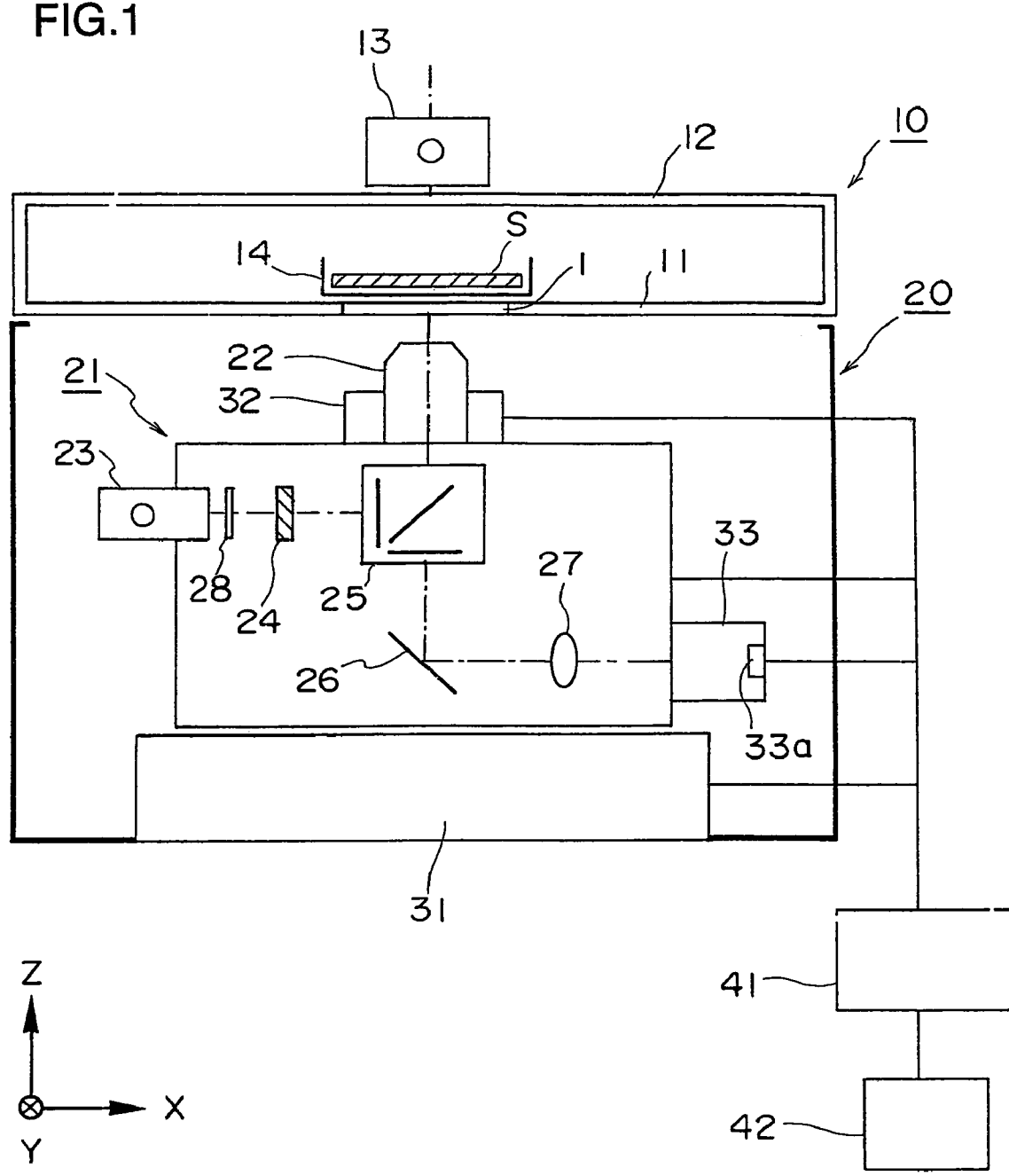
FIG. 1 schematically shows the overall structure adopted in a microscope system achieved in a first embodiment of the present invention.

FIG. 1 schematically shows the overall structure adopted in an optical microscope system in the first embodiment of the present invention. In order to facilitate the explanation, different directions are indicated along the axes of the XYZ orthogonal coordinate system, as shown in the figure.

In the optical microscope system achieved in the first embodiment, a specimen chamber 10 is stacked on top of a casing 20.

The specimen chamber 10 is an airtight container that includes a bottom plate 11 at which a transparent substrate 1 is disposed and an upper plate 12 on which a transmission-type illuminating device 13 is disposed. A culture container 14 that holds a biological specimen S is placed on the transparent substrate 1. The transparent substrate 1, which may be constituted with an optical glass fitted in the bottom plate 11, is utilized as an observation window through which the biological specimen S is observed.

Figure 4:
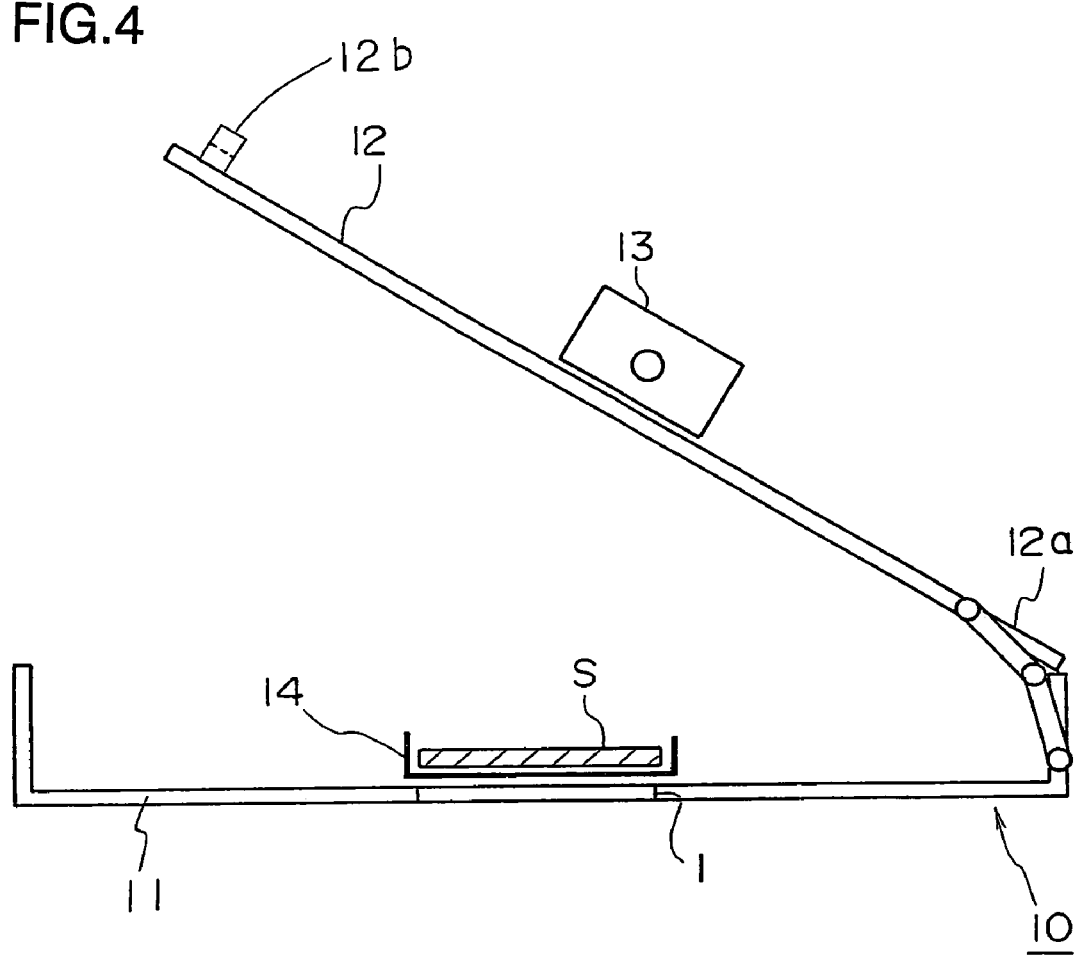
FIG. 4 presents a partial view illustrating the opening/closing structure adopted for a specimen chamber at the microscope system.

Now, a structural feature of the upper plate 12 that allows it to be opened and closed as shown in FIG. 4 when the biological specimen S is to be replaced or the like is explained.

In FIG. 4, showing the structure of the specimen chamber, the specimen chamber is opened to the outside. The upper plate 12 is an open/close plate that is opened/closed as a handle 12b is operated. It is opened on its left side in the figure via a link mechanism 12a. Through this open side, the biological specimen S can be taken out of or placed into the specimen chamber, or maintenance work can be performed inside the specimen chamber 10. This opening/closing structure makes it possible to open the specimen chamber 10 to the outside independently of the casing 20 and thus, the biological specimen S can easily be replaced at any time. In addition, since the specimen chamber is opened over a wide space, the specimen can be replaced without having to tilt the culture container 14 and without allowing the culture container 14 to come in contact with the wall of the specimen chamber 10.

Between the upper plate 12 and a wall portion of the bottom plate 11, a seal member (not shown) is disposed so as to create a completely airtight space inside the specimen chamber 10 while the upper plate 12 is in a closed state.

The casing 20 is a container in which an optical system 21, a two dimensionally movable stage 31, a vertically movable stage 32 and an image-capturing device 33 of the microscope are housed. The casing 20 has an open top. As the specimen chamber 10 is set on the casing 20, the bottom plate 11 closes off the top of the casing 20 and thus, the casing 20 becomes airtight. The bottom plate 11 functions as a barrier that completely isolates the inner space of the specimen chamber 10 from the inner space of the casing 20 and thus, the casing 20 keeps itself in an airtight state independently of the specimen chamber 10.

The optical system 21 includes an objective lens 22, an excitation light illuminating device 23, a light attenuation filter 24, a fluorescence filter 25, a reflecting mirror 26 and a second objective lens 27.

The two-dimensionally movable stage 31, on which the optical system 21, the vertically movable stage 32 and the image-capturing device 33 are placed, moves along the x direction and the y direction over a horizontal plane (over an XY plane). The vertically movable stage 32 holds the objective lens 22 and moves along the optical axis of the objective lens, i.e., along the z direction.

The image-capturing device 33 is disposed near the second objective lens 27.

A control unit 41 is connected to the optical system 21, the two-dimensionally movable stage 31, the vertically movable stage 32 and the image-capturing device 33. The control unit 41 is also connected to a personal computer (PC) 42.

When a biological specimen is to be observed over an extended period of time, the conditions of the specimen environment need to remain constant. Accordingly, the specimen chamber 10 in which the culture container 14 is placed adopts a sealed structure and an environment control device 50 detailed below sustains the conditions (the temperature, the humidity and the $CO_2$ concentration) of the environment in which the biological specimen S is placed at constant levels. In addition to the conditions of the environment surrounding the biological specimen S, the temperature inside the casing 20 is sustained at a constant level.

The following is an explanation of the method adopted to adjust the environment within the specimen chamber 10 and the method adopted to adjust the temperature inside the casing 20.

Figure 2:
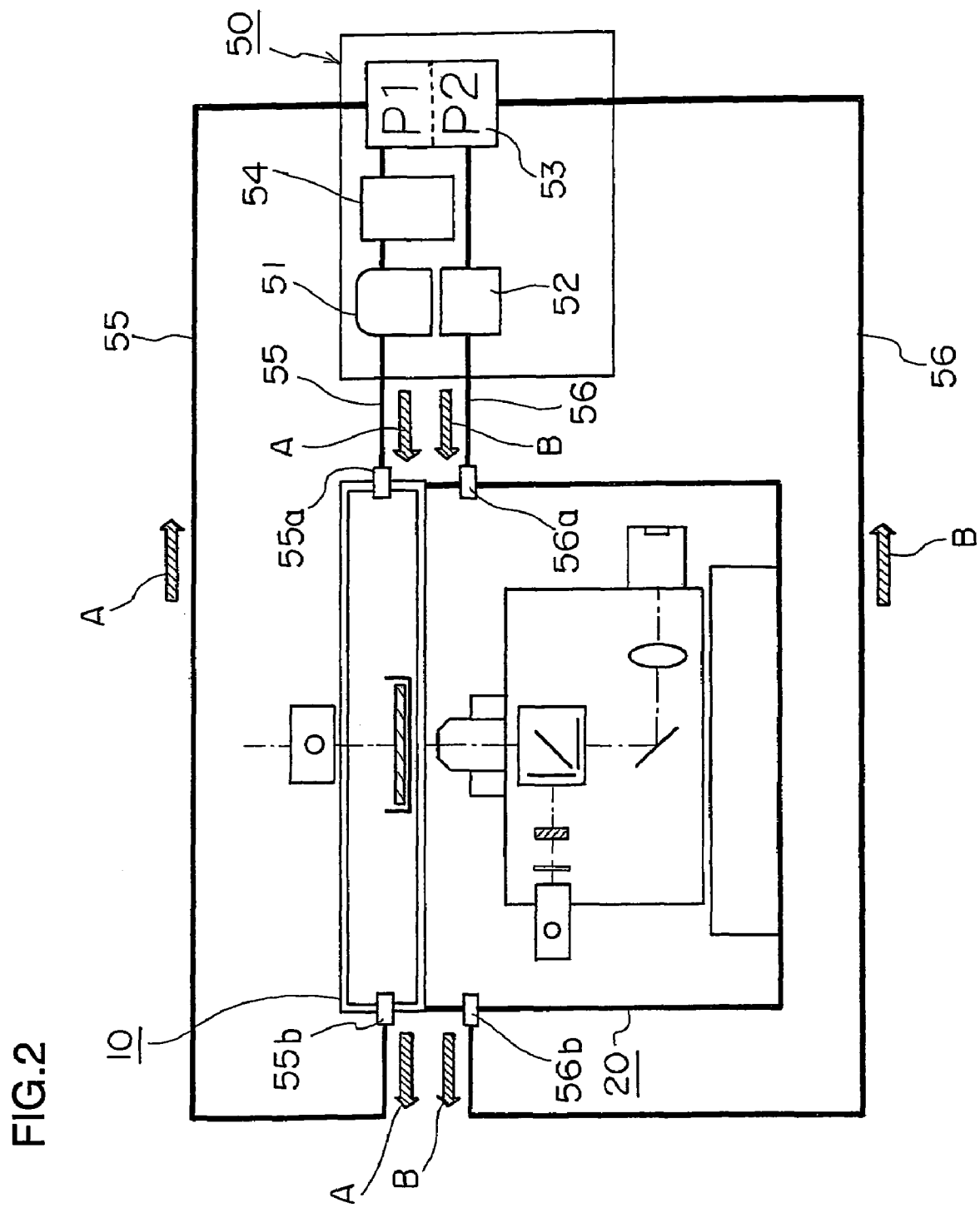
FIG. 2 schematically shows the overall structure that includes an environment control device connected to the microscope system achieved in the first embodiment.

FIG. 2 shows the overall structure that includes the environment control device 50 connected to the optical microscope system in the first embodiment shown in FIG. 1. Components already shown in FIG. 1 are not assigned with reference numerals in FIG. 2 and their explanation is omitted. In addition, the control unit 41 and the PC 42 are not included in FIG. 2 to simplify the illustration.

The environment control device 50 generates a gas achieving a desired temperature, a desired humidity level and a desired composition, and circulates this gas through the specimen chamber 10 and the casing 20. The environment control device 50 includes a humidifier 51, a heater 52, a circulating pump 53 and a gas mixer 54.

Inside the environment control device 50, the humidifier 51 is connected to the circulating pump 53 via the gas mixer 54. The heater 52 is directly connected to the circulating pump 53. In addition, the temperature inside the humidifier 51 is adjusted by the heater 52 to a level equal to the temperature inside the heater 52. The gas mixer 54 is connected through piping with a gas supply unit (e.g., a pressurized canister) (not shown). The gas mixer 54, connected to, for instance, a gas cylinder filled with $CO_2$ gas, adjusts the $CO_2$ concentration inside the specimen chamber 10.

External connections are achieved for the environment control device 50, through the humidifier 51 connected via a tube 55 to a joint portion 55a at the specimen chamber 10 and through the heater 52 connected via a tube 56 to a joint portion 56a at the casing 20.

The circulating pump 53 includes two pumps P1 and P2 that are independent of each other. The pump P1 is connected to the piping (tube) 55, whereas the pump P2 is connected to the piping (tube) 56. Namely, the piping 55 and the piping 56 constitute circulation systems that are independent of each other.

The pump P1 at the circulating pump 53 is connected via the tube 55 with a joint portion 55b disposed at the specimen chamber 10. The pump P2 at the circulating pump 53 is connected via the tube 56 with a joint portion 56b at the casing 20. The tubes and the joint portions are all thermally insulated.

The circulation system for the specimen chamber 10, i.e., the circulation system that includes the piping 55, is indicated with three arrows A. The air adjusted at the gas mixer 54 to achieve a specific gas composition enters the humidifier 51 where its temperature is adjusted to 37° C. and its humidity is adjusted to 100% RH. The circulating pump 53 then feeds the air into the specimen chamber 10 via the tube 55 and the joint portion 55a. The air having circulated through the specimen chamber 10 is discharged through the joint portion 55b and returns to the circulating pump 53 via the tube 55. Subsequently, the air adjusted to achieve the specific gas composition with the temperature and the humidity thereof achieving the specific levels is supplied into the specimen chamber 10 again. Thus, the conditions of the environment inside the specimen chamber 10 are sustained in specific states.

It is desirable to install a temperature sensor (not shown) for monitoring the temperature inside the specimen chamber 10 at a location as close as possible to the culture container 14, provided that its presence does not pose any hindrance to observation.

The circulation system for the casing 20, i.e., the circulation system that includes the piping 56, is indicated with three arrows B. The air heated to 37° C. with the heater 52 is fed by the circulating pump 53 into the casing 20 via the tube 56 and the joint portion 56a. The air having circulated through the casing 20 is discharged via the joint portion 56b and returns to the circulating pump 53 via the tube 56. Then, with its temperature adjusted to the specific level, the air is supplied into the casing 20 again. Thus, the temperature inside the casing 20 is sustained at the predetermined level.

Since the paths of the circulation system for the specimen chamber 10 and the circulation system for the casing 20 are independent of each other, the air in the specimen chamber 10 and the air in the casing 20 do not become mixed with each other.

Next, the microscopic observation conducted on the microscope system is explained.

When observing a transmitted image, the biological specimen S is illuminated with the transmission-type illuminating device 13 and the light transmitted through the biological specimen S travels through the transparent substrate 1 before entering the objective lens 22. The light having entered the objective lens 22 is reflected at the reflecting mirror 26, travels through the second objective lens 27 and forms an image on an image-capturing element 33a (see FIG. 1) of the image-capturing device 33.

When observing a fluorescent image, light emitted from the excitation light illuminating device 23 travels through the light attenuation filter 24 and the fluorescence filter 25 before entering the objective lens 22 through its bottom. The light having entered the objective lens 22 travels through the transparent substrate 1 and is radiated onto the biological specimen S. This excitation light causes the biological specimen S to emit fluorescent light. The fluorescent light travels through the transparent substrate 1, the objective lens 22 and the fluorescence filter 25, is reflected at the reflecting mirror 26, travels through the second objective lens 27 and forms an image on the image-capturing element 33a at the image-capturing device 33.

It is to be noted that a shutter 28 may be disposed on the illuminating light emission side of the excitation light illuminating device 23 and the shutter 28 may be opened only for the fluorescence image observation.

The control unit 41 obtains various types of data related to observation conditions, stage movement conditions, photographing conditions and the like from the PC 42 and outputs control signals generated based upon the data to the optical system 21, the two-dimensionally movable stage 31, the vertically movable stage 32 and the image-capturing device 33. In addition, the control unit 41 outputs various types of control data and image data to the PC 42.

In response to a control signal provided by the control unit 41, the optical system 21 adjusts the brightness at the illuminating light source, switches the individual filters, switches the observation magnification factor and adjusts the visual field aperture.

In response to a control signal provided by the control unit 41, the two-dimensionally movable stage 31, which includes a drive system (not shown), moves the optical system 21, the vertically movable stage 32 and the image-capturing device 33 along the x direction and the y direction. This enables observation of different portions of the biological specimen S and, at the same time, makes it possible to verify the position of the two-dimensionally movable stage 31, i.e., the distance between the portion of the biological specimen S being observed and the origin point position.

Likewise, in response to a control signal provided by the control unit 41, the vertically movable stage 32 moves the objective lens 22 along the z direction. This enables a focal point adjustment for the biological specimen S when the observation magnification factor is switched or when the biological specimen S is replaced.

Through the operations described above, any portion of the biological specimen S can be observed with clarity.

In response to a control signal provided by the control unit 41, the image-capturing device 33 sets the gain for the CCD, the shutter speed and the timing of the photographing operation executed by interlocking with the illuminating device. Microscopic image data of the biological specimen S are provided to the PC 42 via the control unit 41 and are displayed on a display monitor of the PC 42 as a microscopic image. The PC 42 is also capable of executing image processing on the microscopic image and displaying the processed image. In addition, the PC 42 is capable of displaying the control data indicating the observation conditions, the stage movement conditions, the photographing conditions and the like described earlier on the display monitor as necessary.

In the first embodiment, the optical system 21, the two-dimensionally movable stage 31, the vertically movable stage 32 and the image-capturing device 33 are housed inside the casing 20. Among these components, the optical system 21 is ranked as the highest priority component to be housed inside the casing 20, followed by the vertically movable stage 32, the two-dimensionally movable stage 31 and finally the image-capturing device 33 in the priority order. In other words, the component disposed at a position closest to the specimen chamber 10 has the greatest need to be housed inside the casing 20. Accordingly, the image-capturing device 33, which has the least need to be housed inside the casing 20 may be installed outside the casing 20 to reduce the volumetric capacity of the casing 22 for miniaturization.

In addition, some of the optical members constituting the optical system 21 may be disposed outside the casing 20 as well.

Figure 5:
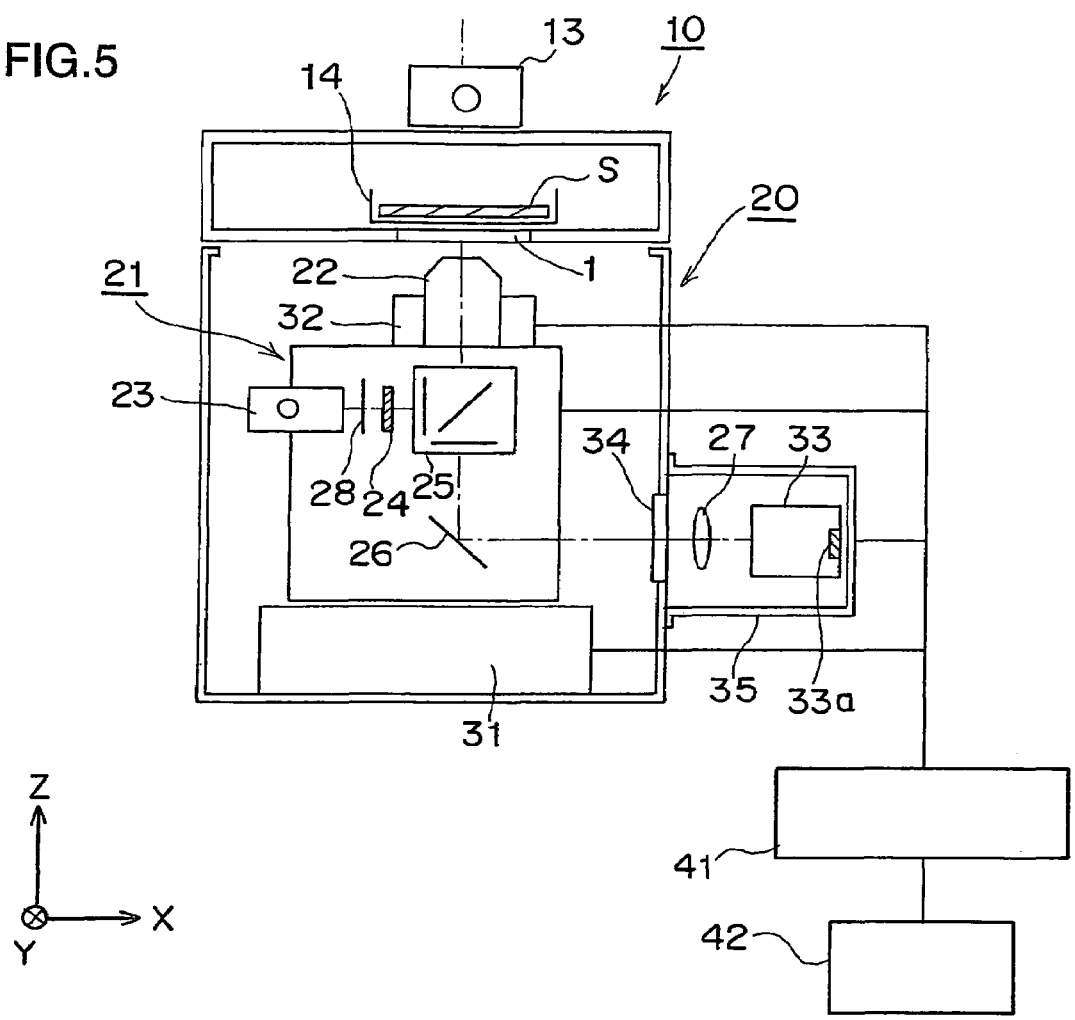
FIG. 5 schematically shows the overall structure of an optical microscope system achieved as a variation of the first embodiment.

FIG. 5 shows a variation of the first embodiment, with the same reference numerals assigned to components identical to those in FIG. 1. The observation optical system that ranges from the objective lens 22 through the second objective lens 27 is an infinity optical element. A parallel light flux formed at the infinite-type optical system is transmitted through a window member 34 disposed at the casing 20 and enters the second objective lens 27 mounted outside the casing 20. The second objective lens 27 and the image-capturing device 35 are both housed inside a casing 35 which is attached to the casing 20.

Since the infinity optical system generates a parallel light flux, the image forming capability is sustained even when the optical system 21 placed on the two-dimensionally movable stage 31 moves along the x direction. In addition, the aperture of the second objective lens 27 should be set large enough to tolerate the distance over which the optical system 21 moves along the y direction. Since the optical system 21 moves over a small distance of approximately several mm, the aperture of the second objective lens 27 only needs to be increased by approximately several mm. Since the moving portion that moves along the x direction and the y direction does not include the second objective lens 27 and the image-capturing device 33 in this structure, the load is reduced and better response is achieved during movement.

The following is an explanation of the functions of the optical microscope system achieved in the embodiment.

First, the environment inside the specimen chamber 10 and the casing 20 is explained. As shown in FIG. 1, the specimen chamber 10 is stacked on top of the casing 20 and airtight spaces that are independent of each other are created inside the specimen chamber 10 and the casing 20.

The biological specimen S is placed in the culture medium inside the transparent culture container 14. The biological specimen S may be cells, cell organelles or the like of an animal or plant. In order to keep the biological specimen S alive for observation over an extended period of time by preventing evaporation of the culture medium, the environment inside the specimen chamber 10 needs to be controlled to sustain a predetermined temperature, a predetermined gas composition and a predetermined high humidity level. For instance, the environment inside the specimen chamber IO may be controlled at 37° C., 100% RH and sustain a $CO_2$ concentration of 5%. Thus, an environment identical to that inside the specimen chamber 10 is achieved inside the culture container 14. In addition, in order to prevent leakage of moist gas or matter evaporated from the culture medium to the outside, the specimen chamber 10 needs to have an airtight structure. A high level of airtightness is sustained over a long period of time by completely sealing the specimen chamber IO except for at the gas flow intake/outlet (the joint portions 55a and 55b).

The temperature inside the casing 20 is maintained at a level substantially equal to the temperature inside the specimen chamber 10, i.e., 37° C. It is not particularly necessary to control the gas composition and the humidity inside the casing 20. By keeping the temperatures inside the casing 20 and the specimen chamber 10 equal to each other, it is assured that no condensation or fogging occurs at the transparent substrate 1. In addition, since there is no difference in the temperature between the casing 20 and the specimen chamber 10 to affect the optical system 21, a focal point change attributable to thermal expansion of the optical components does not occur. Furthermore, since the optical system 21 is not exposed to the high humidity environment in the specimen chamber 10 while the biological specimen S is being observed or while the upper plate 12 is opened to replace the biological specimen S, the optical components and the illuminating device are not damaged.

The level of airtightness achieved at the casing 20 may be lower than the level of airtightness that needs to be achieved at the specimen chamber 10, as long as the temperature inside the casing 20 is sustained at a level substantially equal to the temperature in the specimen chamber 10 and the casing 20 is sealed to such an extent that it is hardly affected by the external environment. Since the casing 20 does not need to have an extremely high level of airtightness, electric wiring can be installed and the gas flow intake/outlet can be mounted with ease.

Second Embodiment

Figure 3:
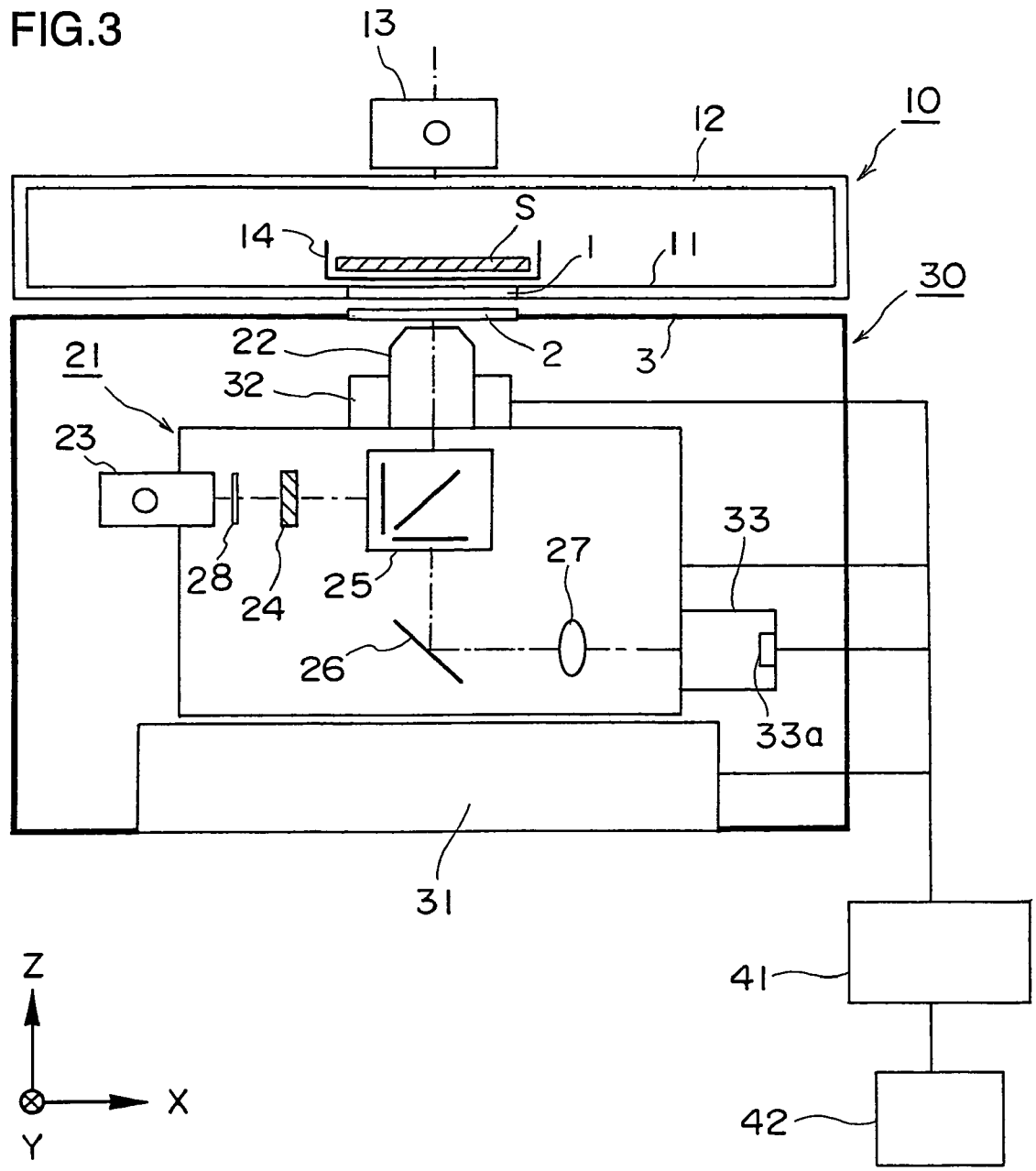
FIG. 3 schematically shows the overall structure of the microscope system achieved in a second embodiment of the present invention.

FIG. 3 schematically shows the overall structure adopted in the optical microscope system achieved in the second embodiment of the present invention. The same reference numerals are assigned to components identical to those in FIG. 1 and their explanation is omitted.

The optical microscope system in the second embodiment differs from the optical microscope system in the first embodiment in the connecting area (contact area) where the specimen chamber 10 is stacked on the casing.

The casing 20 in the first embodiment does not include a ceiling plate. As the specimen chamber 10 is stacked atop the casing 20, as shown in FIG. 1, the bottom plate 11 of the specimen chamber 10 becomes a barrier that separates the inner space of the specimen chamber 10 from the inner space of the casing 20 so as to keep the specimen chamber 10 and the casing 20 in an airtight state independently of each other.

A casing 30 in the second embodiment shown in FIG. 3, on the other hand, includes a ceiling plate 3 at which a transparent substrate 2 is disposed. The ceiling plate 3 also functions as a barrier. Thus, regardless of whether or not the specimen chamber 10 is stacked, the specimen chamber 10 and the casing 30 are each kept in an airtight state independently of each other in the first place. Accordingly, the atmosphere inside the casing 30 remains constant at all times, even when the entire specimen chamber 10 is being replaced. The specimen chamber 10 adopting the opening/closing structure shown in FIG. 4 can be opened to the outside independently of the casing 30 to allow the biological specimen S to be exchanged at any time with ease. In addition, since the specimen chamber is opened over a wide space, the specimen can be replaced without having to tilt the culture container 14 and without allowing the culture container 14 to come in contact with the wall of the specimen chamber 10.

The lower surface of the bottom plate 11 and the upper surface of the ceiling plate 3 may be set in contact with each other or they may be set to range parallel to each other over a very small distance between them. Likewise, the transparent substrates 1 and 2 may be set in contact with each other or set so as to range parallel to each other over a small distance separating them. It is most desirable to set the bottom plate 11 and the ceiling plate 3 in contact and the transparent substrates 1 and 2 in contact so as to reliably maintain the temperatures inside the specimen chamber 10 and the casing 30 equal to each other.

If the bottom plate 11 and the ceiling plate 3 are distanced from each other, atmospheric air at room temperature may flow into the gap between them to cause condensation or fogging at the inner surface of the transparent substrate 1 or induce focal point fluctuations, an optical axis offset and the like at the optical system 21. Such eventualities may be prevented by disposing a sealing member such as an O-ring at the external circumferences of the bottom plate 11 and the ceiling plate 3.

While the problems described above may be averted, there is still an optical problem to be addressed if the transparent substrates 1 and 2 are set apart from each other. Namely, since there will be air present between the transparent substrates 1 and 2, reflection occurs for a total of two times, at their surfaces facing opposite each other, which leads to a light quantity loss. Such a loss may be prevented by optically integrating the transparent substrates 1 and 2. For instance, the gap between the transparent substrates 1 and 2 may be filled with liquid immersion oil with a refractive index equal to that of the transparent substrates 1 and 2.

It is to be noted that the transparent substrate 1 disposed at the bottom plate 11 and the transparent substrate 2 disposed at the ceiling plate 3 each only need to have an area large enough to cover, at least, the observation optical path. In addition, the entire bottom plate 11 may be constituted with the transparent substrate 1, and the entire ceiling plate 3 may be constituted with the transparent substrate 2.

Operational effects similar to those in the first embodiment are achieved in a structure that includes the environment control device 50 described earlier in conjunction with the optical microscope system in the second embodiment shown in FIG. 3.

In addition, the casing in the optical microscope system in the second embodiment, too, can be provided as a compact unit by adopting a structure such as that shown in FIG. 5, to achieve operational effects identical to those in the first embodiment.

The basic operational effects of the optical microscope system in the first embodiment and the optical microscope system in the second embodiment are similar to each other. Namely, the space inside the specimen chamber 10 and the space inside the casing 20 or 30 are each kept in an airtight state independently of each other, and thus, the casing 20 or 30 is not exposed to the high humidity environment inside the specimen chamber 10. As a result, the optical components and the illuminating device are protected from damage. Since the specimen chamber 10 can be opened to the outside independently of the casing 20 or 30, the specimen can be replaced at any time with ease.

In addition, since the specimen chamber 10 and the casing 20 or 30 are disposed adjacent to each other and their internal temperatures are maintained at levels equal to each other, the transparent substrate 1 remains free of condensation or fogging, and any instability or change occurring over time at the optical system 20 is kept to a minimum. As a result, microscopic observation and recording can be conducted in a stable manner over a long period of time.

Furthermore, with the optical system housed in the casing 20 or 30, the microscope is set in a state similar to that achieved by installing the microscope in a darkroom. As a result, a fluorescence image observation can be conducted without having to darken the room.

The following is an explanation of variations of the present invention.

The optical microscope systems in the first and second embodiments both include the two-dimensionally movable stage 31, which is used to move the optical system 21 for observation of different portions of the biological specimen S. In other words, the specimen chamber 10 and the transmission-type illuminating device 13 are fixed relative to the casing 20 constituting the microscope main unit. Instead, a structure that includes a fixed optical system 21 and allows movement of the culture container 14 containing the biological specimen S may be adopted. Since only the culture container 14 needs to be moved in this structure, the moving mechanism can be miniaturized and the entire optical microscope system can be provided as a more compact unit.

In the optical microscope system achieved in either the first embodiment or the second embodiment, the specimen chamber 10 is stacked on the casing 20 or 30. Instead, the casing 20 or 30 may be stacked on top of the specimen chamber 10. This structure should be adopted in an upright microscope instead of an inverted microscope. Since the specimen does not need to be observed through the culture container 14, even a biological specimen present outside the culture medium can be observed with a microscope adopting this structure. However, if the casing 20 has an open bottom, the optical system of the upright microscope must be mounted at a side plate or the upper plate of the casing 20.

As described above, in the first and second embodiments of the present invention, airtight spaces independent of each other are formed in the specimen chamber 10 and the casing 20 or 30 to facilitate temperature and humidity control. Thus, an optical microscope system ideal for observation of a biological specimen over an extended period of time, which does not allow the focal plane to become unstable, can be provided.

Third Embodiment

Figure 6:
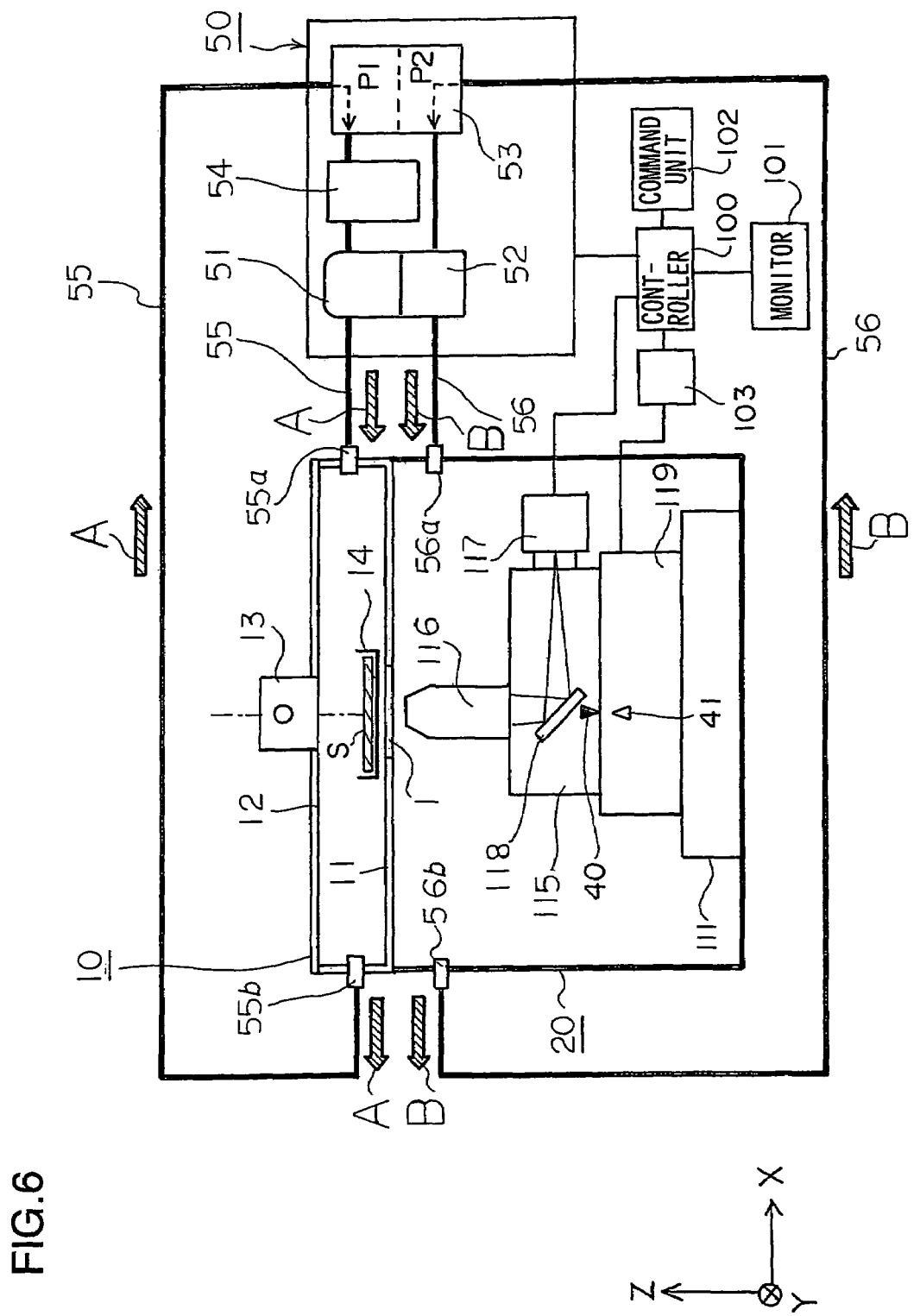
FIG. 6 schematically shows the overall structure of the microscope system achieved in a third embodiment of the present invention.

Next, the microscope system achieved in the third embodiment is explained. FIG. 6 shows the structure of the microscope system achieved in the third embodiment. The same reference numerals are assigned to components having functions similar to those in the first embodiment shown in FIGS. 1 and 2. The explanation focuses on the features differentiating the third embodiment from the first embodiment.

As in the first embodiment, the microscope system achieved in the third embodiment includes the specimen chamber 10 in which the culture container 14 holding a biological specimen S is placed and the casing 20 in which an optical system, an image-capturing device 117 and the like of the microscope are housed. In addition, the environment control device 50 controls the environment inside the specimen chamber 10 at, for instance, 37° C., 100% RH with a $CO_2$ concentration of 5%, and sustains the temperature inside the casing 20 at a constant level (e.g., 37° C.).

As shown in FIG. 6, a base (microscope main unit) 111 of the microscope system, a movable stage 119 fixed onto the base 111, a microscope casing 115 fixed onto the movable stage 119, an objective lens 116, the image-capturing device 117 used to photograph an observation image and the like are housed inside the casing 20. The objective lens 116 and the image-capturing device 117 are disposed at the microscope casing 115. The objective lens 116 is disposed under the culture container 14, at a position corresponding to the position of the transmission-type illuminating device 13. Thus, the biological specimen S inside the culture container 14 is illuminated from above in FIG. 6 with the transmission-type illuminating device 13 and the light having been transmitted through the biological specimen S and having passed through the transparent substrate 1 is observed through the objective lens 116. It is to be noted that the objective lens 116 and a reflecting mirror 118 constitute an observation optical system of the microscope system in FIG. 6.

The light from the objective lens 116 is reflected at the reflecting mirror 118 and forms an image on an image-capturing surface of the image-capturing device 117. While the image-capturing device 117 may be constituted with a confocal microscope device, a CCD camera or the like, an explanation is given in reference to the third embodiment on an example in which the image-capturing device is constituted with a CCD camera. A controller 100 is a control device that executes overall control of the microscope and includes an image processing unit for processing image-capturing signals from the image-capturing device 117 and the like. The image-capturing signals provided by the image-capturing device 117 are processed at the image processing unit inside the controller 100 and the resulting specimen image (digital image) having been captured at the image-capturing device is displayed at a monitor 101. The monitor 101 may be constituted with a liquid crystal display element (LCD) or the like. A stage control device 103 controls the movement of the movable stage 119. Stage movement instructions for moving the stage so as to observe a desired portion of the biological specimen S and instructions for various types of microscope adjustments including optical filter switching, aperture switching, objective lens switching and illuminating light quantity adjustment are issued via an operation unit included in a command unit 102.

The microscope casing 115 fixed onto the upper surface of the movable stage 119 can be moved via the movable stage 119 along the x direction, the y direction and the z direction in the figure relative to the base 111. It is to be noted that the movable stage 119 may only move along the x direction and the y direction with the objective lens 116 allowed to move along the z direction instead. The movable stage 119 is driven by a pulse motor, a DC motor equipped with an encoder or the like, and the distance over which the movable stage travels can be measured by counting the number of output pulses.

An origin point position (reference position) is set in advance for the movable stage 119. For instance, the origin point may be set at the position at which the observation position is adjusted to the center of the culture container 14. At the movable stage 119, a detector 41 is disposed in correspondence to the origin point position. The detector 41, which may be constituted with a photo interrupter or the like, generates an origin point signal each time a shielding plate used as a reference 40 travels past the detector 41. As the movable stage 119 is set at the position set in correspondence to the origin point signal provided by the detector 41, the optical axis of the objective lens 116 is set aligned at the center of the culture container 14. The following explanation is given by assuming that the detector is constituted with a photo interrupter. It is to be noted that the detector 41 and the reference 40 are installed as a unit along both the x direction and the y direction.

The movable stage 119 which causes the microscope casing 115 to move along the x direction and the y direction is allowed to assume two modes of movement, i.e., a coarse movement and a fine movement to a position only slightly distanced from the measurement point. The fine movement occurs within the specimen over a distance of approximately several mm at the most. The fine movement is controlled by using pulses.

Figure 7:
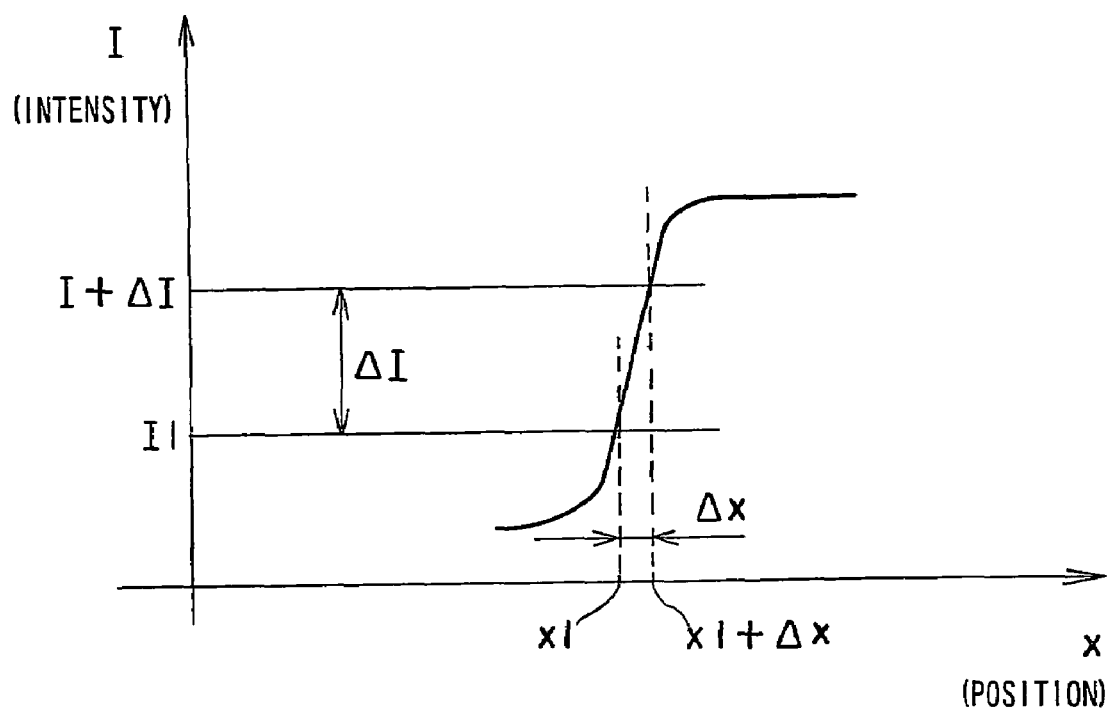
FIG. 7 is a diagram provided to facilitate an explanation of the signal output from a detector.

The coarse movement is explained first. As the reference 40 moves past the detector 41, a signal I such as that shown in FIG. 7 is output from the detector 41. Such an output signal I can be identified in advance with accuracy. When positioning the movable stage 119, the position of the movable stage 119 along the x direction is adjusted through feedback control so as to keep the signal I within the range of I1 to I1+ΔI. Thus, the position of the movable stage 119 is set within the range of x1 to x1+Δx. By narrowing the range of ΔI as much as possible, the movable stage can be positioned with accuracy in the order of 0.1 μm.

The distance over which the movable stage is moved in the fine movement is controlled by counting pulses. If, for instance, the minimum traveling distance of the movable stage 119 is 5 μm per pulse, its movement over 10 pulses will change the observation position by 50 μm.

Fourth Embodiment

Figure 8:
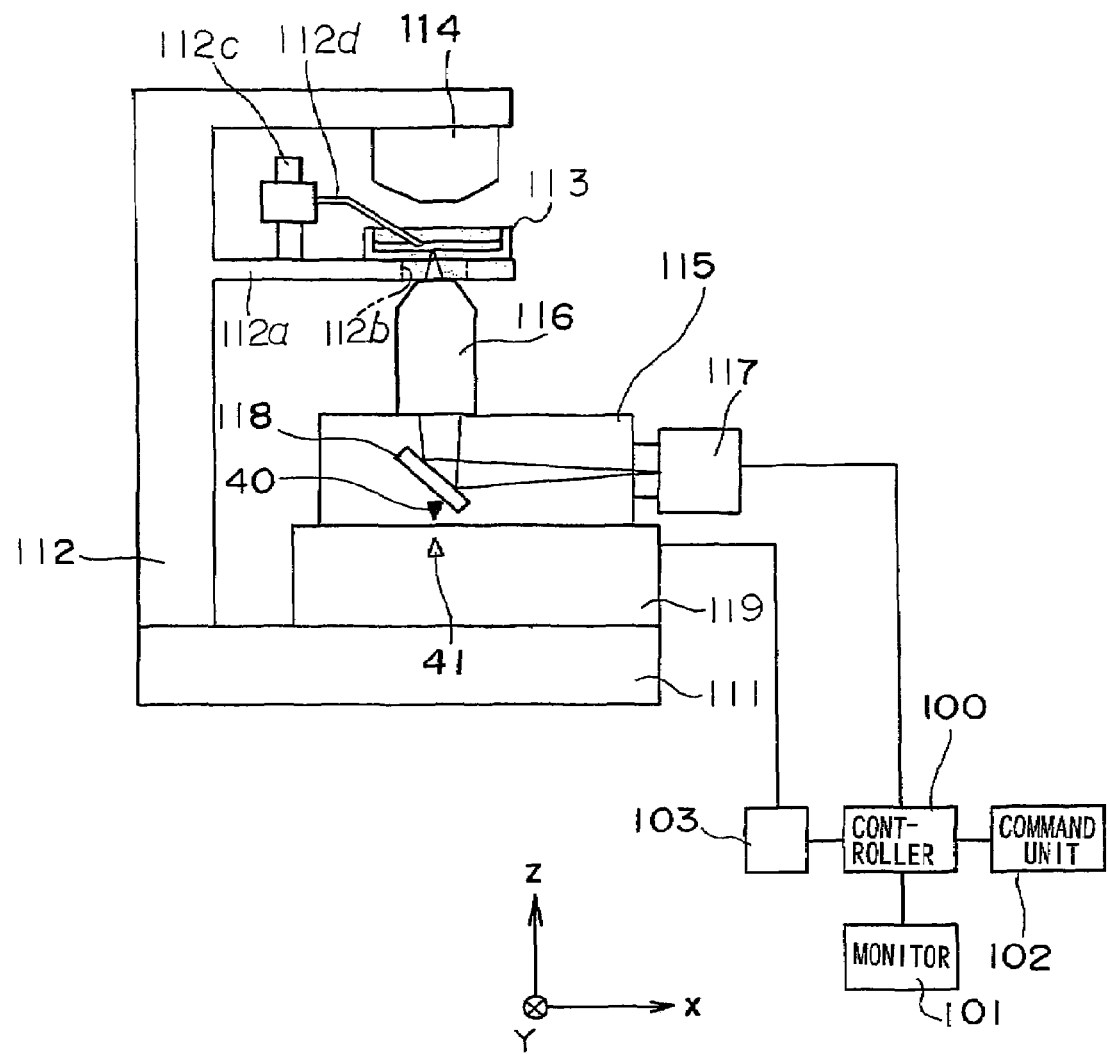
FIG. 8 schematically shows the overall structure of the microscope system achieved in a fourth embodiment of the present invention.

The microscope system achieved in the fourth embodiment is next explained. FIG. 8 schematically shows the structure adopted in the microscope system achieved in the fourth embodiment. The same reference numerals are assigned in FIG. 8 to components having functions identical to those in the third embodiment shown in FIG. 6. The following explanation focuses on the features that distinguish the fourth embodiment from the third embodiment. It is to be noted that the microscope system in the fourth embodiment does not include the specimen chamber 10, the casing 20 and the environment control device 50.

FIG. 8 illustrates observation of a specimen (biological specimen) in a culture container 113, illuminated with transmission light. A stand 112 and the movable stage 119 are fixed onto the base 111 of the microscope system. An observation opening 112b is formed at a specimen mount portion 112a of the stand 112, and the culture container 113 containing the specimen is placed over the area where the opening 112b is formed. A support 112c used to support a manipulator is disposed at the specimen mount portion 112a. In the example presented in the figure, a dosing tube 112d is attached to the support 112c.

The microscope casing 115 is fixed onto the movable stage 119. The objective lens 116 and the image-capturing device 117 used to photograph an observation image are disposed at the microscope casing 115. A transmission-type illuminating device 114 is disposed at the stand 112 above the specimen mount portion 112a. The objective lens 116 disposed at the microscope casing 115 is positioned under the specimen mount portion 112a at which the culture container 113 is placed, so as to face opposite the transmission-type illuminating device 114. Namely, the specimen contained in the culture container 113 is illuminated by the transmission-type illuminating device 114 from above in the figure and the light having been transmitted through the specimen and passed through the opening 112b is observed through the objective lens 116.

As in the third embodiment, the detectors 41 are disposed at the movable stage 119 and the references 40 are disposed at the microscope casing 115. The movable stage 119 makes coarse movement based upon signals output from the detectors 41 and makes fine movement in correspondence to pulses so as to adjust the position of the microscope casing 115. Since the movable stage makes the coarse movement and the fine movement by adopting a method similar to that explained in reference to the third embodiment, a repeated explanation thereof is not provided.

In the microscope system shown in FIG. 8, the stand 112 at which the culture container 113 is placed is a fixed stand and the microscope casing 115 is allowed to move along three directions, i.e., the x direction, the y direction and the z direction, relative to the stand 112.

If the observation position of the specimen is adjusted by moving a stage supporting the culture container 113 in an inverted microscope in which the solution inside the culture container 113 is rotated via the dosing tube 112d or the membrane voltage at a cell is measured, the tube for the solution rotation may become disengaged or the patch used in the potential measurement may become disengaged. If the entire microscope is made to move instead of the specimen stage in an upright microscope system, the front end of the objective lens may come in contact with the solution in the culture container 113 and thus, the range of movement will become limited. In addition, the high-speed movement of the entire microscope, which is considerable in size, will induce a vibration that may cause disengagement of the tube used to rotate the solution or the patch used in the potential measurement.

However, the microscope system achieved in the fourth embodiment, which adopts the structure described above, allows the observation point to be adjusted without having to move the culture container 113 or the dosing tube 112d so as to keep the specimen inside the culture container 113 in a stable condition. In addition, it does not require the illuminating device 114 to move and thus has a smaller moving portion that is able to move at high-speed without causing significant vibration.

Figure 9:
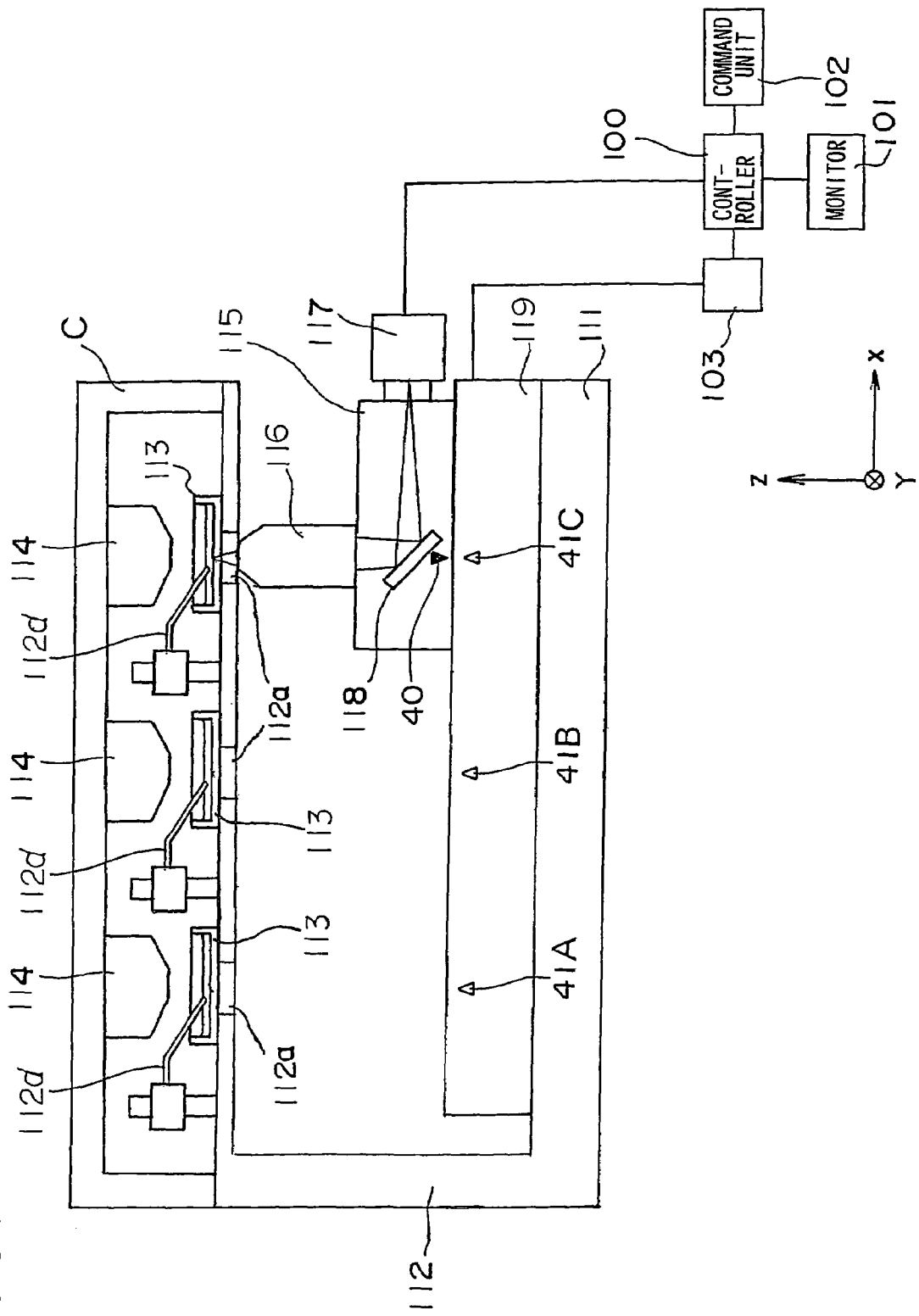
FIG. 9 shows the structure of a microscope system achieved as a variation of the fourth embodiment.

FIG. 9 shows a variation of the fourth embodiment.

The movable stage 119 and the stand 112 are fixed onto the base 111. Three specimen mount portions 112a, each fitted with an optical glass, are formed at the stand 112. It is to be noted that instead of fitting glass in the specimen mount portions, culture containers 113 may be placed at the specimen mount portions to be held as a seal. The culture containers 113 are set at these specimen mount portions 112a. Namely, three culture containers 113 set on the stand 112 can be observed in sequence with the microscope system shown in FIG. 9. A cover C with three illuminating devices 114 each disposed in correspondence to one of the specimen mount portions 112a is mounted on the stand 112 so as to cover the culture containers 113. As a result, the culture containers 113 are placed in an airtight environment. The microscope casing 115 and the movable stage 119, on the other hand, are not set in an air tight environment.

It is to be noted that an environment control device similar to that used in the third embodiment may be utilized to control the environment (the temperature and humidity) inside the cover C (inside a specimen chamber).

Detectors 41A, 41B and 41C each corresponding to one of the specimen mount portions 112a are disposed along the x direction at the movable stage 119. The detectors 41A through 41C, similar to the detectors 41 described earlier, each generate an origin point signal as the position of the reference 40 becomes aligned with the position of the detector 41A, 41B or 41C while the microscope casing 115 is moved along the x direction via the movable stage 119. Namely, by using the detectors 41A through 41C, the objective lens 116 can be set at positions at which the individual specimen mount portions 112a are located. It is to be noted that although not shown, a detector 41 and a reference 40 used commonly in conjunction with the three specimen mount portions 112a are disposed along the y direction.

The movable stage 119 makes coarse movement to move the objective lens 116 between different culture containers 113, and the objective lens 116 is positioned at a specific specimen mount portion 112a based upon a signal provided by the detector 41a, 41B or 41c. The observation point within a given culture container 113 is adjusted through the fine movement as explained earlier.

Fifth Embodiment

Figure 10:
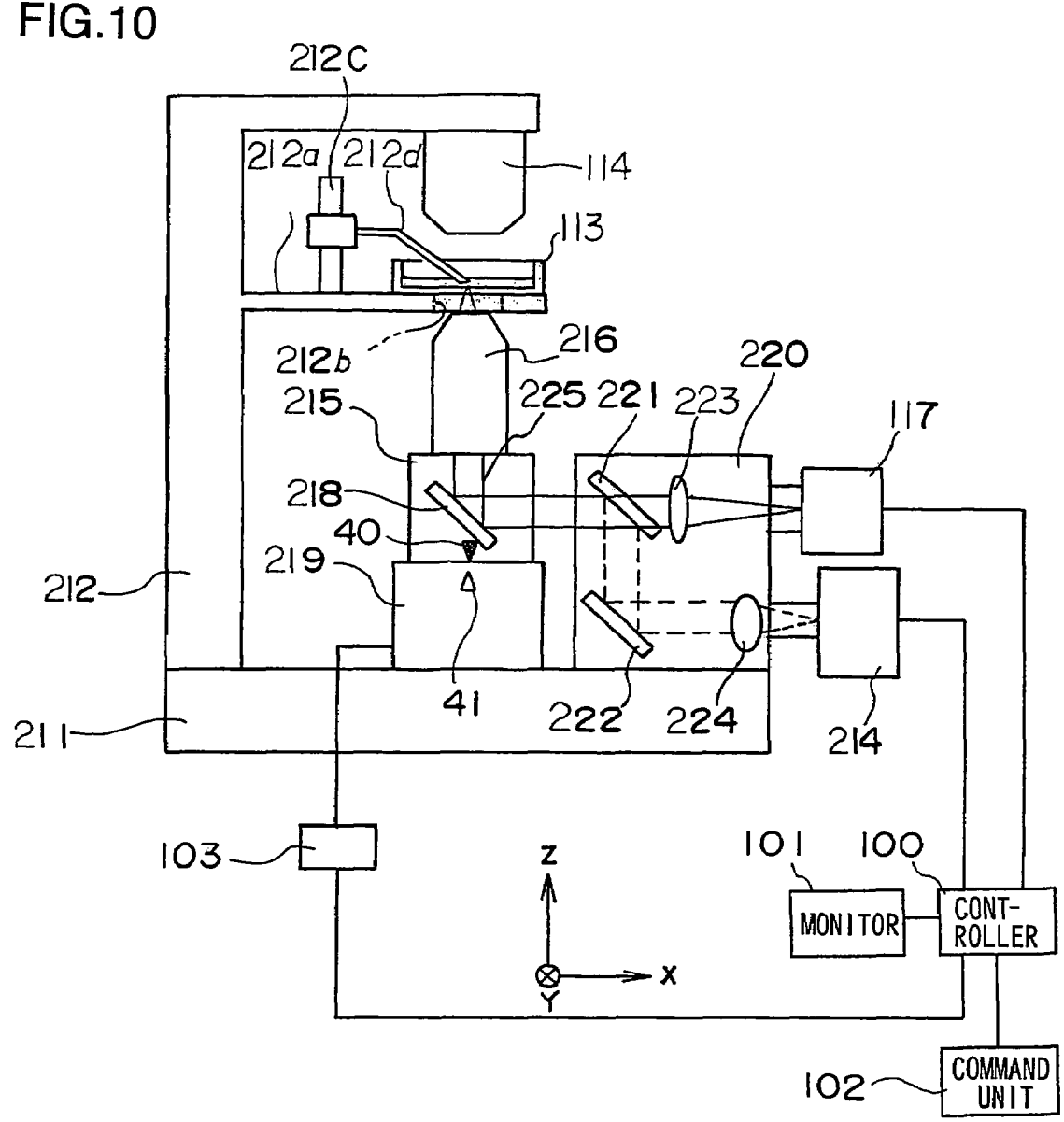
FIG. 10 schematically shows the overall structure of the microscope system achieved in a fifth embodiment of the present invention.

FIG. 10 shows the microscope system achieved in the fifth embodiment of the present invention. The microscope system achieved in the fourth embodiment in FIG. 8 is characterized in that the entire observation optical system is moved and that the optical system is miniaturized through the use of a finite-type objective lens and a finite-type optical system. In the fifth embodiment, on the other hand, only part of the observation optical system is allowed to move. In addition, in order to move only the part of the observation optical system that includes the objective lens, an infinity objective lens is used in conjunction with an optical system constituted with an image forming lens and an image-capturing device disposed at a fixed portion.

The same reference numerals are assigned in FIG. 10 to components identical to those in the fourth embodiment shown in FIG. 8. The explanation focuses on features of the embodiment that differentiate it from the fourth embodiment.

A stand 212, a movable stage 219 and a microscope casing fixed portion 220 are fixed to a base 211 of the microscope system. The movable stage 219 is controlled by a stage control device 103. An observation opening 212b is formed at a specimen mount portion 212a of the stand 212, and the culture container 113 containing the specimen is placed over the area where the opening 212b is formed. At a support 212c used to hold a manipulator, which is disposed at the specimen mount portion 212a, a dosing tube 212d is attached as in the fourth embodiment. The transmission-type illuminating device 114 is disposed at the stand 212 so that the specimen inside the culture container 113 is observed with transmission illuminating light.

The microscope casing in the microscope system achieved in the fifth embodiment is constituted with two separate units, the fixed portion 220 and a moving portion 215. The microscope casing moving portion 215 is fixed onto the movable stage 219. The microscope casing moving portion 215 fixed onto the upper surface of the movable stage 219 is allowed to move via the movable stage along the x direction, the y direction and the z direction in the figure. As in the fourth embodiment, the detectors 41 are disposed along the x axis and the y axis at the movable stage 219. At the microscope casing moving portion 215, the references 40 are disposed. The moving mechanism used to move the movable stage 219 is similar to that employed in conjunction with the movable stage 119 described earlier, achieving a function similar to that explained in reference to the movable stage 119, when moving the observation point. Thus, its explanation is not provided.

At the microscope casing moving portion 215, and objective lens 216 and a reflecting mirror 218 are disposed. At the microscope casing fixed portion 220, an epi-illumination device 214 is disposed, as an additional illuminating device independent of the transmission-type illuminating device 114 disposed at the stand 212. In addition, the image-capturing device 117 that captures an observation image and optical members 221, 222, 223 and 224 used to guide the illuminating light from the epi-illumination device 214 toward the microscope casing moving portion 215 and form the observation image at the image-capturing device 117 are disposed at the microscope casing fixed portion 220. The optical members 223 and 224 are lenses, the optical member 222 is a reflecting mirror and the optical member 221 is a beam splitter. It is to be noted that the optical member 223 is used as the image forming optical system in the microscope system.

While the specimen can be observed under transmission illuminating light or under epi-illumination light in the microscope system achieved in the fifth embodiment, the following explanation focuses on observation conducted under epi-Ilumination light.

Illuminating light emitted from the epi-illumination device 214 travels through the lens 224, the reflecting mirror 222 and the beam splitter 221 and then enters the reflecting mirror 218 at the microscope casing moving portion 215. The illuminating light reflected at the reflecting mirror 218 enters the culture container 113 via the objective lens 216 and illuminates a specific area of the specimen. The light having exited the specimen is guided to the image-capturing device 117 via the objective lens 216, the reflecting mirror 218, the beam splitter 221 and the lens 223 and the observation image is formed on the image-capturing surface of the image-capturing device 117.

The objective lens 216 is an infinity optical system, and thus, the light having departed the focal plane of the specimen becomes a parallel light flux 225 after passing through the objective lens 216, and the parallel light flux 225 is guided to the beam splitter 221 by the reflecting mirror 218. In addition, the illuminating light emitted from the epi-illumination device 214 becomes a parallel light flux at the lens 224, and the parallel illuminating light flux enters the reflecting mirror 218 via the reflecting mirror 222 and the beam splitter 221.

The microscope system in FIG. 10 adopts a structure that allows at least the rays at the center of the parallel light flux formed with the light from the specimen present within the effective visual field of the objective lens 216 to pass through an entrance pupil of the image forming optical system even when the microscope casing moving portion 215 is made to move via the movable stage 219. Since a stroke of the microscope casing moving portion 215 is approximately several mm, the apertures of the optical members 221 and 223 are set to larger values by an extent corresponding to the movement of the microscope casing moving portion 215 along the y direction. In other words, since the distance over which the microscope casing moving portion 215 moves within its allowable range is approximately several mm, the apertures of the optical members 221 and 223 only need to be increased in size by several mm in correspondence. Since only part of the observation optical system is made to move instead of the entire observation optical system, the load on the microscope casing moving portion 215 is reduced, which improves the response.

Figure 11:
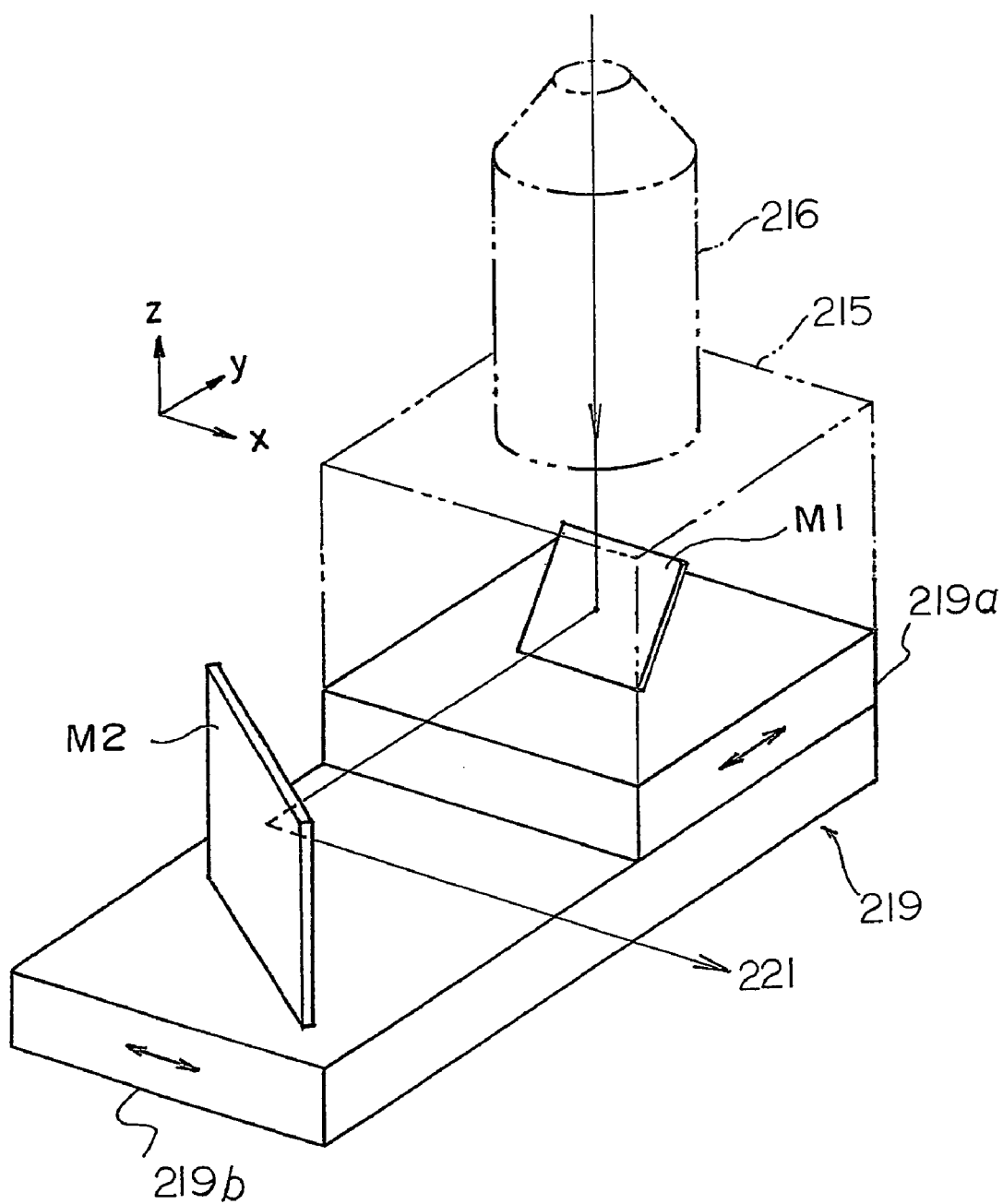
FIG. 11 is a perspective showing the positions of mirrors.

It is to be noted that the movable stage 219 may need to move with a greater stroke along the x direction and the y direction in order to enable observation of a plurality of culture containers or a large culture container 113. In such a case, a mirror M1 for reflecting the light along the y direction should be disposed together with the objective lens 216 at a y direction moving portion 219a of the movable stage 219 and a mirror M2 for reflecting the light along the x direction should be disposed, together with the mirror M1, the objective lens 216 and the y direction moving portion 219a, at an x direction moving portion 219b of the movable stage 219, so as to prevent the light flux from becoming offset from the beam splitter 221, as shown in FIG. 11.

As described above, in the fifth embodiment, too, the observation position can be adjusted by moving the microscope casing moving portion 215 relative to the culture container 113 placed on the stand 212. Thus, advantages similar to those of the fourth embodiment can be achieved. In addition, since the light flux from the specimen becomes the parallel light flux 225, the microscope casing can be split into the fixed portion 220 and the moving portion 215 of which only the moving portion 215 is made to move relative to the stand 212. This reduces the weight of the object to be moved via the movable stage 219, which, in turn, allows the object to be moved at greater speed. In addition, the extent of vibration occurring as the movable stage starts/stops moving can be reduced.

Sixth Embodiment

Figure 12:
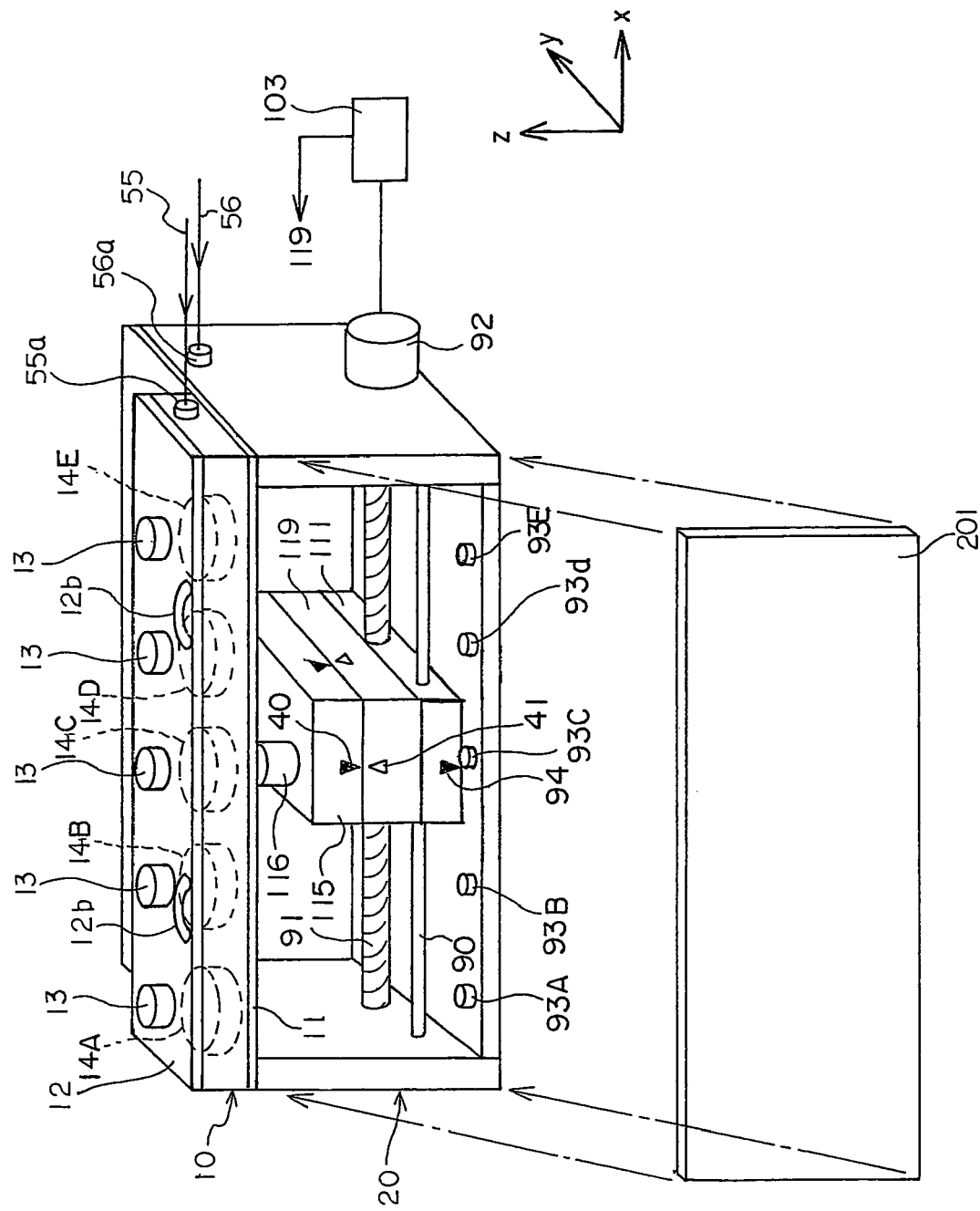
FIG. 12 schematically shows the overall structure of the microscope system achieved in a sixth embodiment of the present invention.

FIG. 12 shows the microscope system achieved in the sixth embodiment of the present invention, which allows an observation with transmission illuminating light. In the sixth embodiment, the environment in the specimen chamber containing the biological specimen S is controlled and the temperature in the casing where the microscope is housed is sustained at a constant level, as in the third embodiment explained earlier. It is to be noted that while a single culture container 14 is placed inside the specimen chamber 10 in the third embodiment, five culture containers 14A through 14E are placed in a single row inside the specimen chamber 10 in the sixth embodiment shown in FIG. 12.

It is to be noted that while the system shown in FIG. 12, too, includes the controller 100, the monitor 101, the command unit 102 and the stage control device 103 similar to those shown in FIG. 6, they are not included in the illustration. In addition, the piping 55 and the piping 56 are respectively connected to the joint portion 55a, at the specimen chamber 10 and the joint portion 56a at the casing 20, with the environment control device 50 (not shown) similar to that shown in FIG. 6 connected via the pipings 55 and 56.

Although hidden under the culture containers 14A through 14E in FIG. 12, five observation windows are fitted at the bottom plate 11 as in the specimen chamber 10 shown in FIG. 6, and the culture containers 14A through 14E are set over the observation windows. It is to be noted that instead of disposing glass to function as the observation windows, culture containers directly set in the openings may be used as windows. At the open/close lid (upper plate) 12 of the specimen chamber 10, five transmission-type illuminating devices 13A through 13E are disposed each at a position facing opposite one of the observation windows.

Inside the casing 20, a microscope comprising the base 111, the movable stage 119, the microscope casing 115 at which the objective lens 116 is disposed and the image-capturing device 117 (not shown) is installed. It is to be noted that a front surface 201 of the casing 20 is taken off in FIG. 12 to better show the internal structure adopted in the casing 20. Near the bottom of the casing 20, a guide 90 and a feed screw 91 both extending to the left and the right (along the x axis) are disposed. A motor 92 rotationally drives the feed screw 91. The motor 92 maybe a pulse motor or a DC motor equipped with an encoder. The guide 90 is inserted through the base 111 and the feed screw 91 is interfixed through the base 111. As the motor 90 drives the feed screw 91 to rotate forward or backward, the base 111 is caused to move to the left or the right along the guide 90. The motor 90 is controlled by the stage control device 103.

The movable stage 119, the objective lens 116, the microscope casing 115 and the image-capturing device 117 adopt structures similar to those shown in FIG. 6. At the movable stage 119, the detectors 41 used to position the movable stage 119 at the origin point are disposed, one for movement along the x direction and the other for movement along the y direction. At the microscope casing 115, the references 14 are disposed each in correspondence to one of the detectors 41. In addition, at the bottom plate of the casing 20, detectors 93A through 93E used to set the base 111 at the position of the individual culture containers 14A through 14E are disposed. A reference 94 is disposed at the base 111 to be used in conjunction with the detectors 93A through 93E. As are the detectors 41, the detectors 93A through 93E are each constituted with a photo interrupter or the like, and as are the references 40, the reference 94 is constituted with a shielding plate.

In the sixth embodiment, the culture containers 14A through 14E are observed sequentially by moving a single microscope along the x direction. FIG. 12 shows the base 111 of the microscope set at the observation position for observing the culture container 14C, with the observation point of the objective lens 116 positioned at the center of the culture container 14C. The positioning operation is executed by using the detector 93C and the reference 94.

In this state, the feed screw 91 is driven by the motor 92 to rotate forward to the observation position for the next culture container 14B. Once the detector 93B detects the reference 94, the motor 92 is stopped and the base 111 is set at the position determined by the detector 93B. As a result, the observation point of the objective lens 116 is positioned at the center of the culture container 14B. The subsequent adjustment of the observation point inside the culture container 14B is made as has been explained in reference to the previous embodiment.

Biological specimens are observed over an extended period of time normally by observing the individual specimens in sequence over predetermined time intervals (e.g., over 15-minute intervals). They may be observed in the order of, for instance, the culture container 14A→the culture container 14B→the culture container 14C→the culture container 14D→the culture container 14E over the predetermined time intervals. Under such circumstances, the lens can be positioned quickly and accurately through the coarse movement between the individual containers, which is achieved by using the motor 92 and the detectors 93B through 93E. In addition, even though the observation is conducted repeatedly over the predetermined time intervals, the repeatability of the observation positions is very high.

Variation 1 of the Sixth Embodiment

Figure 13:
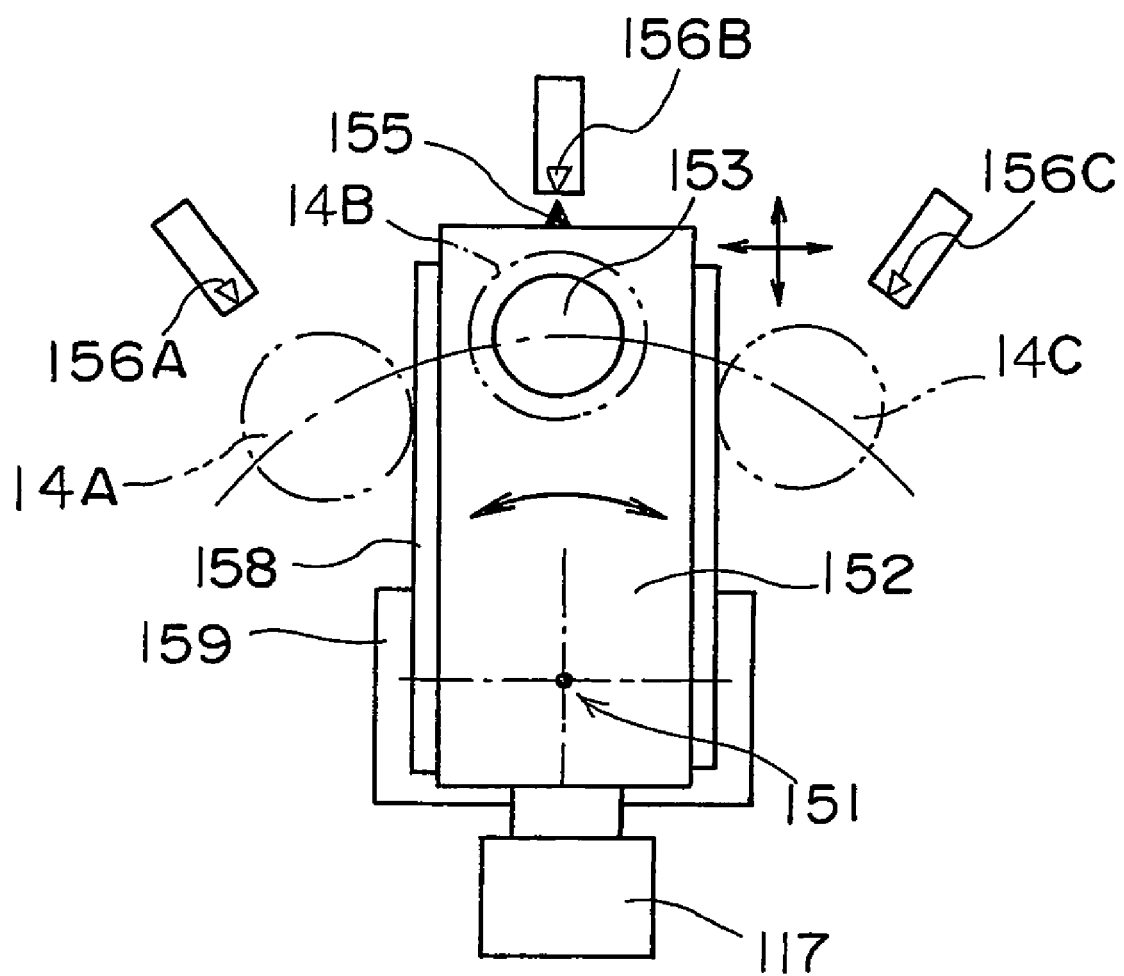
FIG. 13 shows variation 1 of the sixth embodiment.

An explanation is given above in reference to the sixth embodiment on an example in which a plurality of culture containers 14A through 14E set in a single row are observed with a single microscope. In variation 1 shown in FIG. 13, culture containers 14A through 14C are set so as to form a circular arc. FIG. 13 is a plan view of the microscope system taken from above, with the stand at which the culture containers 14A through 14C are set not included in the illustration. It is to be noted that while the specimen chamber 10, the casing 20 and the environment control device 50 explained earlier are not shown in FIG. 13, the microscope system may or may not include these, depending upon the specific purposes of use.

An xy stage 158 to which a microscope casing 152 is fixed is set on top of a rotating stage 159. Thus, the xy stage 158 on which the microscope casing 152 is stacked can be made to rotate around a rotational axis 151 via the rotating stage 159. An objective lens 153 and the image-capturing device 117 are disposed at the microscope casing 152. Reference numerals 156A, 156B and 156C indicate detectors disposed respectively in correspondence to the culture containers 14A through 14C, and the detectors 156A through 156C are disposed so as to form a circular arc. At the microscope casing 152, a reference 155 is disposed.

It is to be noted that the structures of the reference 155 and the detectors 156A through 156C are similar to those of the references 40 and the detectors 41A through 41C described earlier. In variation 1, too, an origin point signal is generated each time the reference 155 moves past the detector 156A, 156B or 156C as the microscope casing 152 rotates. In variation 1, the coarse movement is achieved through the rotating movement via the rotating stage 159 and the fine movement is achieved via the XY stage 158.

Variation 2 of the Sixth Embodiment

Figure 14A:
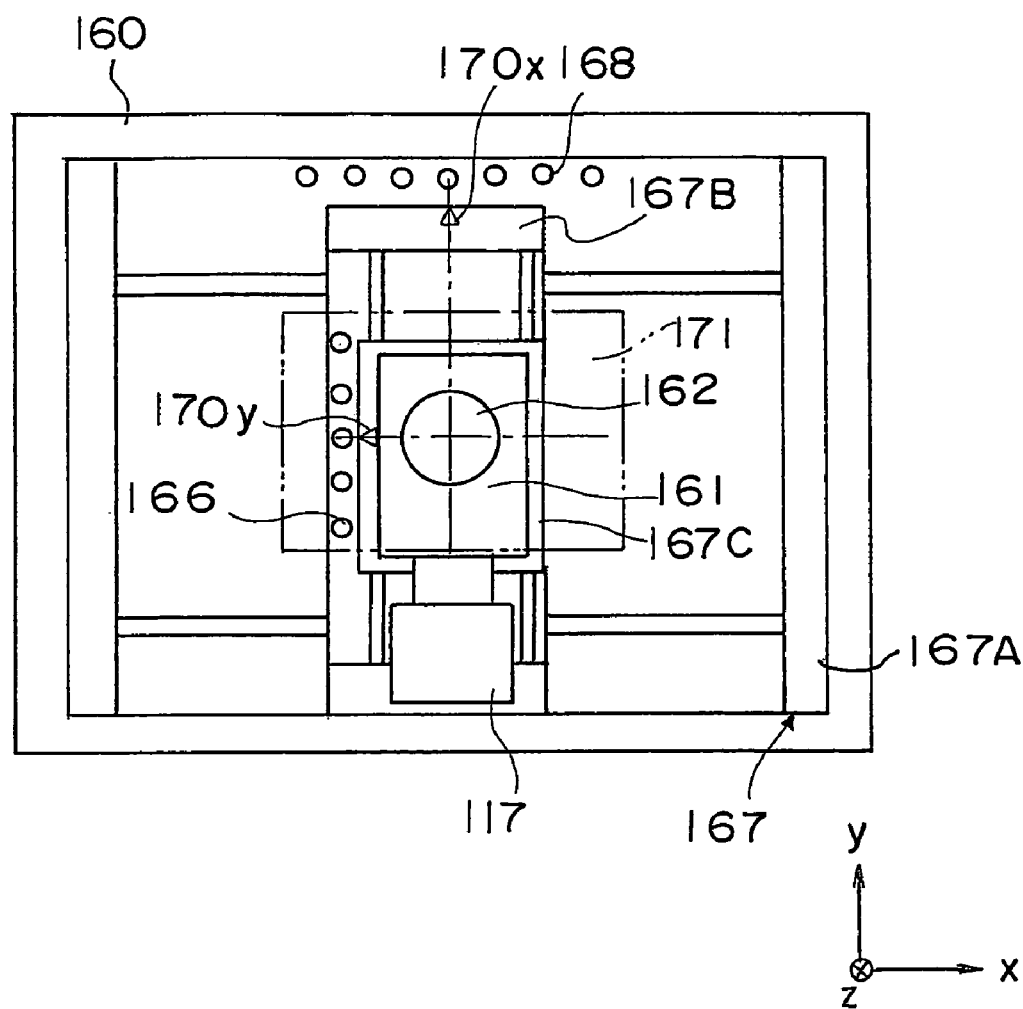
FIGS. 14A and 14B are plan views, respectively showing the microscope system achieved as variation 2 of the sixth embodiment and a culture container.
Figure 14B:
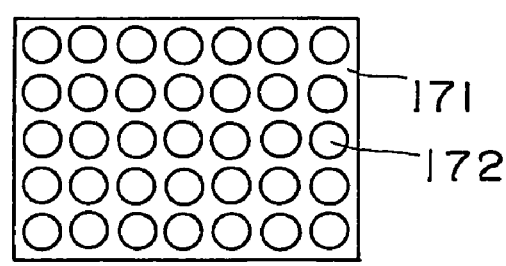

FIG. 14A is a plan view of the microscope system achieved in variation 2, with a culture container 171 such as that shown in FIG. 14B placed at the stand (not shown) of the microscope system. It is to be noted that FIG. 14A does not include illustration of the stand. While the specimen chamber 10, the casing 20 and the environment control device 50 are not included in the illustration of variation 2, the microscope system in variation 2 may or may not include these, depending upon the specific purposes of use. As shown in FIG. 14B, a plurality of wells 172 each to hold a specimen are formed in a lattice pattern at the culture container 171. The specimen is placed in each of the wells 172. An x stage 167 is fixed onto a base 160 of the microscope system, and a movable portion 167B moves along the x direction relative to a fixed portion 167A of the x stage 167.

The movable portion 167B also functions as a fixed portion of a y stage, and a y movable portion 167C capable of moving along the y direction is disposed at the movable portion 167B. A microscope casing 161 is fixed onto the y movable portion 167C which includes a z movement mechanism for moving the microscope casing 161 along the z direction. An objective lens 162 and the image-capturing device 117 are disposed at the microscope casing 161.

A plurality of detectors 168 are disposed side-by-side along the x direction at the fixed portion 167A of the x stage 167. The number of detectors 168 matches the number of wells 172 set along the x direction at the culture container 171 and the detectors 168 are disposed over intervals equal to the intervals over which the wells 172 are formed along the x direction. An x reference 170x is disposed at the movable portion 167B to be used in conjunction with the detectors 168.

A plurality of detectors 166 is disposed side-by-side along the y direction at the movable portion 167B. The number of detectors 166 matches the number of wells 172 set along the y direction at the culture container 171 and the detectors 166 are disposed over intervals equal to the intervals along which the wells 172 are formed along the y direction. In addition, a y reference 170y is disposed at the y movable portion 167C, to be used in conjunction with the detectors 166. Since the references 170x and 170y and the detectors 168 and 166 adopt structures similar to those of the references 40 and the detectors 41A through 41C described earlier, their explanation is omitted.

In variation 2, the movable portion 167B is allowed to make a coarse movement along the x direction, i.e., it is allowed to move from a given well to the next well along the x direction, based upon origin point signals provided by the detectors 168. In addition, the movable portion 167C is allowed to make a coarse movement along the y direction, i.e., it is allowed to move from one well to the next well along the y direction, based upon origin point signals provided by the detectors 166. In this example, too, the observation position within a given well 172 is adjusted through fine movement of the movable portions 167B and 167C effected based upon pulse signals.

An explanation is given above in reference to the third through sixth embodiments on an example in which the positioning operation is executed by utilizing detectors constituted with photo interrupters. However, the present invention is not limited to this example and the positioning operation may instead be executed by using a mechanical positioning device such as a click mechanism for positioning. In addition, as long as the features characterizing the present invention remained intact, the present invention is not limited to the examples presented in the embodiments in any way whatsoever.

As explained above, the observation position is adjusted in the microscope systems achieved in the third through sixth embodiments by moving the observation optical system through which the culture container is observed from below. This structure remains free of problems such as the tube for solution rotation and the patch used in the potential measurement, which are attached to the specimen (biological specimen), becoming disengaged even when the observation optical system is made to move at high speed to adjust the observation position.

While an explanation is given above on an example in which the present invention is adopted in the microscope system that employs an image-capturing device to capture an image of a biological specimen, the present invention may also be adopted in a microscope system that includes an eyepiece lens or the like to allow the user to directly observe a biological specimen.

The above described embodiments are examples, and various modifications can be made without departing from the spirit and scope of the invention.

What is claimed is:

1. A microscope system, comprising:
   an airtight specimen chamber, in which a specimen is placed, that maintains an environmental condition in the specimen chamber;
   a first casing disposed adjacent to the specimen chamber, that houses an objective lens for observing the specimen;
   a second casing disposed adjacent to the first casing, that houses an image forming lens for forming an image of the specimen from the objective lens onto an image sensor; and
   an environment control unit that controls temperature and humidity in the specimen chamber and also controls temperature inside the first casing, wherein
   environmental conditions of the specimen chamber, the first casing, and the second casing are set independent of each other.

2. A microscope system according to claim 1, wherein the control unit adjusts a temperature in the specimen chamber and a temperature in the first casing to a same temperature.

3. A microscope system according of claim 1, wherein the objective lens in the first casing and the image forming lens in the second casing form an infinity optical system.

4. A microscope system according to claim 1, further comprising:
   a transmission illuminating device that irradiates a transmission illumination light to the specimen in the specimen chamber; and
   an epi-illumination device that irradiates an epi-illumination light to the specimen in the specimen chamber.

* * * * *